(No Model.)
C. E. DOBBINS.
SHACKLE FOR COUPLING SPRINGS.
No. 481,107. Patented Aug. 16, 1892.
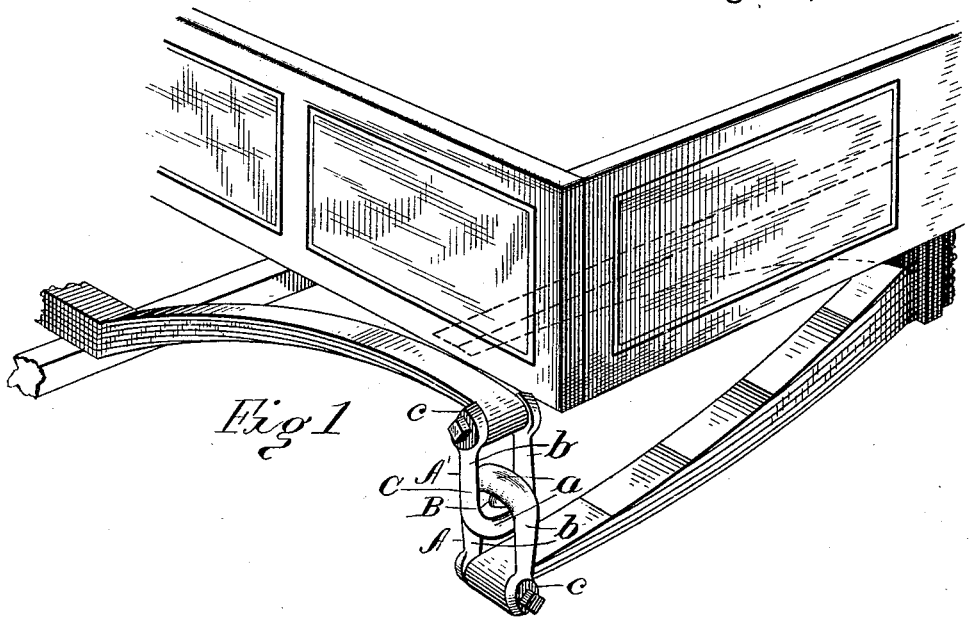
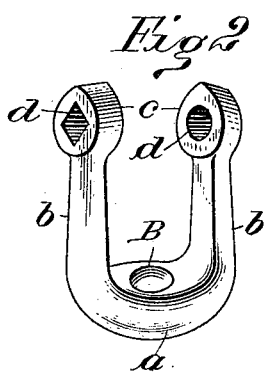
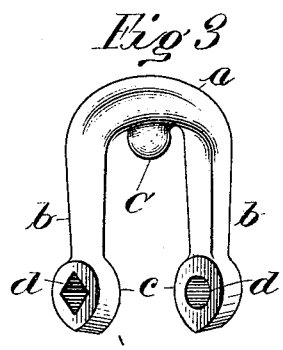
WITNESSES:
C. C. Burdine
A. Cowell
Charles E. Dobbins
INVENTOR
By
W. T. Fitz Gerald & Co.,
ATTORNEYS.

UNITED STATES PATENT OFFICE.

CHARLES EDWARD DOBBINS, OF CHICAGO, ILLINOIS.

SHACKLE FOR COUPLING SPRINGS.

SPECIFICATION forming part of Letters Patent No. 481,107, dated August 16, 1892.

Application filed April 28, 1892. Serial No. 431,028. (No model.)

*To all whom it may concern:*

Be it known that I, CHARLES EDWARD DOBBINS, a citizen of the United States, residing at Chicago, in the county of Cook and State of Illinois, have invented certain new and useful Improvements in Shackles for Coupling Vehicle-Springs; and I do hereby declare the following to be a full, clear, and exact description of the invention, such as will enable others skilled in the art to which it appertains to make and use the same.

My invention has relation to improvements in shackles for vehicle-springs; and it consists in the construction and arrangement of parts, as will be hereinafter described, and particularly pointed out in the claim.

The invention will be fully understood from the following description and claim, when taken in conjunction with the accompanying drawings, in which—

Figure 1 is a perspective view illustrating my improved shackle as connecting two springs disposed at right angles to each other. Fig. 2 is an enlarged perspective view of one of the clips composing the shackle, and Fig. 3 is a similar view of the other clip of the shackle.

Referring by letter to the said drawings, A A' indicate the clips of my improved shackle, which are preferably of a general U form, as shown, and respectively comprise the cross-head $a$ and the parallel walls with free open spaces, which are designed to straddle a spring, as shown, and are provided at their free ends with heads $c$, having transversely-disposed apertures $d$ for the passage of a bolt, through the medium of which each clip is connected to its spring.

Formed in the inner side of the cross-head $a$ of the clip A is a socket B, which is designed and adapted to seat the ball or globular protuberance C upon the inner side of the cross-head $a$ of the clip A', so as to form a smooth ball-and-socket bearing, and thereby prevent undue frictional wear of the clips, as well as to render the movement of the springs very smooth and even.

Having thus described my invention, what I claim, and desire to secure by Letters Patent, is—

The shackles for coupling the springs of vehicles together, consisting of two clips made in U form and one of which having walls forming free open spaces with a socket formed in the bend of its walls, and a clip with corresponding shaped walls having a ball formed in the bend of its walls to engage in the socket of the first-named clip, whereby both of said clips are adapted to have vertical play within each other without obstruction, substantially as and for the purposes specified.

In testimony whereof I affix my signature in presence of two witnesses.

CHARLES EDWARD DOBBINS.

Witnesses:
CHAS. J. TRANSIER,
PETER J. FEENEY.